No. 12,648 REISSUED MAY 7, 1907.

J. J. SHEA.

ASEPTIC DRINKING CUP.

APPLICATION FILED JULY 17, 1905.

Witnesses:
Everett S. Emery.
Robert H. Hammler.

Inventor,
John J. Shea,
by Emery Booth + Terrell
Attys.

UNITED STATES PATENT OFFICE.

JOHN J. SHEA, OF BEVERLY, MASSACHUSETTS, ASSIGNOR TO ASEPTIC DRINKING CUP COMPANY, OF CAMBRIDGE, MASSACHUSETTS, A CORPORATION OF MAINE.

ASEPTIC DRINKING-CUP.

No. 12,648. Specification of Reissued Letters Patent. Reissued May 7, 1907.

Original No. 759,029, dated May 3, 1904. Application for reissue filed July 17, 1905. Serial No. 270,155.

*To all whom it may concern:*

Be it known that I, JOHN J. SHEA, a citizen of the United States, and a resident of Beverly, in the county of Essex and State of Massachusetts, have invented certain new and useful Improvements in Aseptic Drinking-Cups, of which the following is a specification.

This invention relates to improvements in aseptic drinking-cups; and it has for its object the prevention of the spread of diseases caused by promiscuous use of ordinary cups at public drinking-fountains, hospitals, public conveyances, etc. It is intended to be used but once or by the same person and then destroyed. When not in use, it may be folded flat and carried in the pocket, preferably inclosed within an envelop, card-case or suitable inclosing device. It is also adapted for use as a sputum-cup for hospitals or sanitariums. It can be manufactured at a very slight expense when made in quantities for the trade.

The invention is carried out as follows, reference being had to the accompanying drawings, wherein,—

Figure 1:
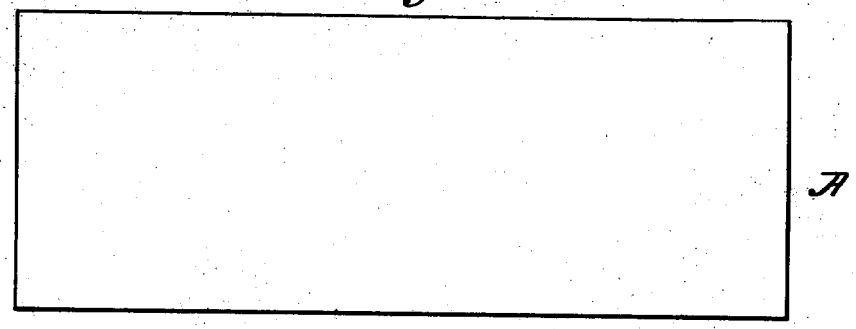
Figure 2:
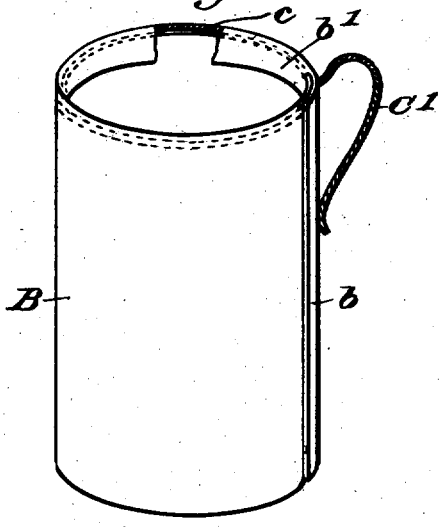
Figure 3:
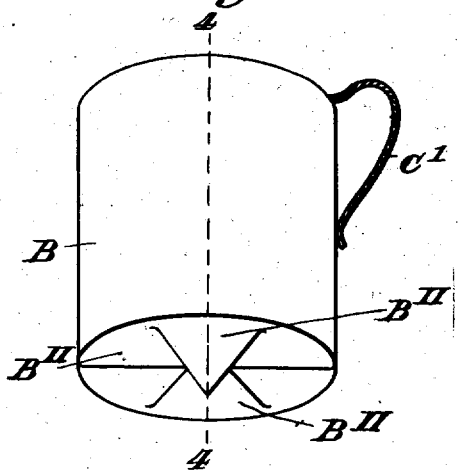
Figure 4:
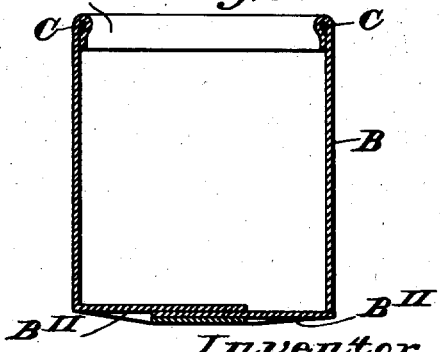

Figure 1 is a top plan view of a blank of paper or other suitable textile or fibrous material from which the cup is made; Fig. 2 is a perspective view showing the said blank formed as a cylindrical or similar open-ended tube reinforced in one end with a flexible or ductile rim preferably made of metal wire, integral with which is an extension or handle; Fig. 3 is a perspective view of the finished cup, showing its bottom closed; Fig. 4 is a vertical section on the line 4—4 shown in Fig. 3; and Fig. 5 shows the cup in a folded position.

Similar letters refer to similar parts wherever they occur on the different parts of the drawings.

In making my aseptic drinking-cup I use a blank A of paper or other suitable flexible textile or fibrous material, as shown in Fig. 1, which is afterward formed into an open-ended tube B, (shown in Fig. 2) the overlapping longitudinal edges of which are adhesively secured, as shown at *b*. To the upper open end of said tube is attached in a suitable manner a ductile or flexible rim C, preferably made of metal wire, shown as being adhesively secured to the body portion by inclosing said wire within an annular lip *b'* and securing the latter to the upper body portion by cement or other suitable adhesive material. The said rim is extended at one place in the form of a hook or handle C', by means of which the cup can be held when in use.

Figure 5:
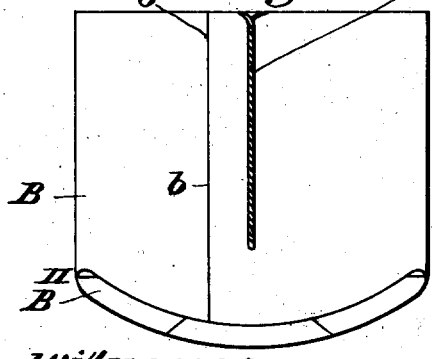

The lower open end of the cup is closed by overlapping folds B'' B'', properly attached together by cement or other suitable adhesive material, as shown in Figs. 3, 4 and 5. The cup is then dipped into or impregnated with hot liquid paraffin or other suitable waterproof material, by which the cup is rendered aseptic and waterproof for the purposes stated.

When not in use the cup may be collapsed and folded flat, as shown in Fig. 5, thus occupying a very small place, and may be carried inclosed in an envelop, pocket-book, etc. ready for use as occasions may requires.

To the end that the cup may always be collapsed along symmetrical and predetermined lines, the walls of the cup may be permanently creased, as at *b'*, (Fig. 5) and the base may also be creased transversely from one to the other of the lower extremities of the creases *b'*. The creases *b'* serve also to stiffen the walls of the cup when the cup is open.

Claim

1. A drinking-cup formed of a sheet of collapsible material adapted to be folded flat along predetermined lines and having two of its edges suitably secured together and having one end closed, the other end being open and provided with a flange, and a band of flexible material arranged between said flange and the body of the cup provided with an extension projecting from the cup and adapted to form a handle therefor, said band adapted when the cup is folded to be folded therewith and when the cup is open to be opened therewith and to hold the mouth of the cup substantially rigid when open.

2. A drinking cup formed of collapsible material, having one end closed, the other end being open, and a foldable band provided with an extension projecting from the cup and adapted to form a handle therefor, said band adapted when the cup is folded to be folded therewith, and when the cup is open to be opened therewith and to hold the mouth of the cup substantially rigid when open.

3. A drinking cup formed of a sheet of collapsible material suitably fashioned into cup form and having one end closed, the other end being open and provided with a flange, and a band of flexible material arranged between said flange and the body of the cup provided with an extension projecting from the cup and adapted to form a handle therefor, said band adapted when the cup is folded to be folded therewith and when the cup is open to be opened therewith and to hold the mouth of the cup firm when open.

In testimony whereof I have signed my name to this specification, in the presence of two subscribing witnesses.

JOHN J. SHEA.

Witnesses:

EVERETT S. EMERY,
RALPH C. POWELL.